P. MEYER.
PIPE TESTING AND LEAK FINDING DEVICE.
APPLICATION FILED AUG. 10, 1918.
1,340,176. Patented May 18, 1920.
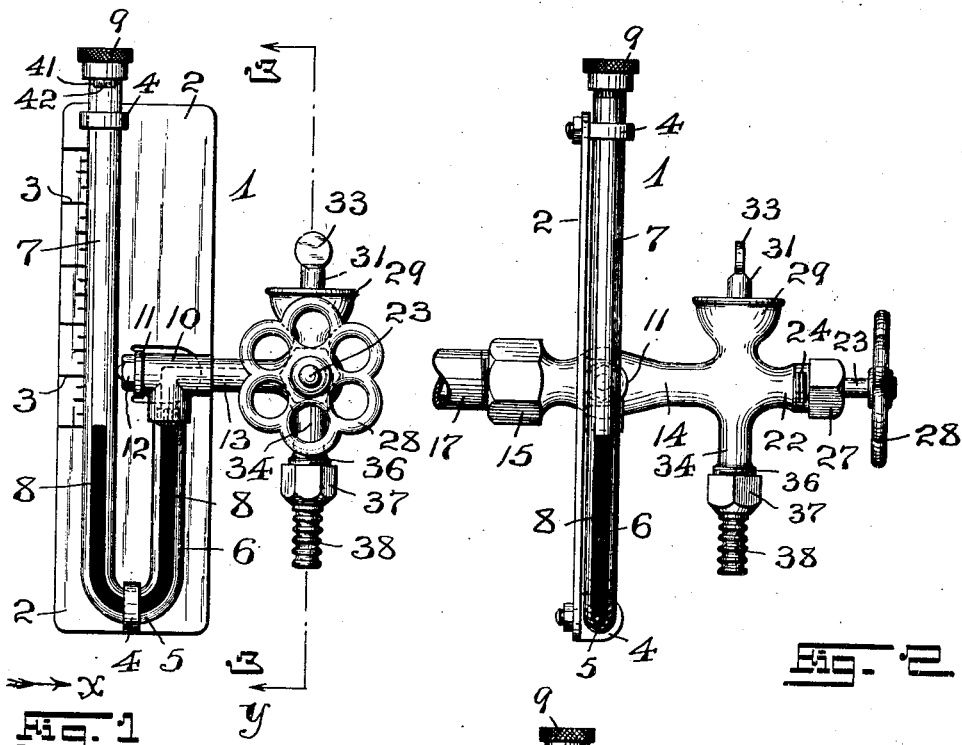
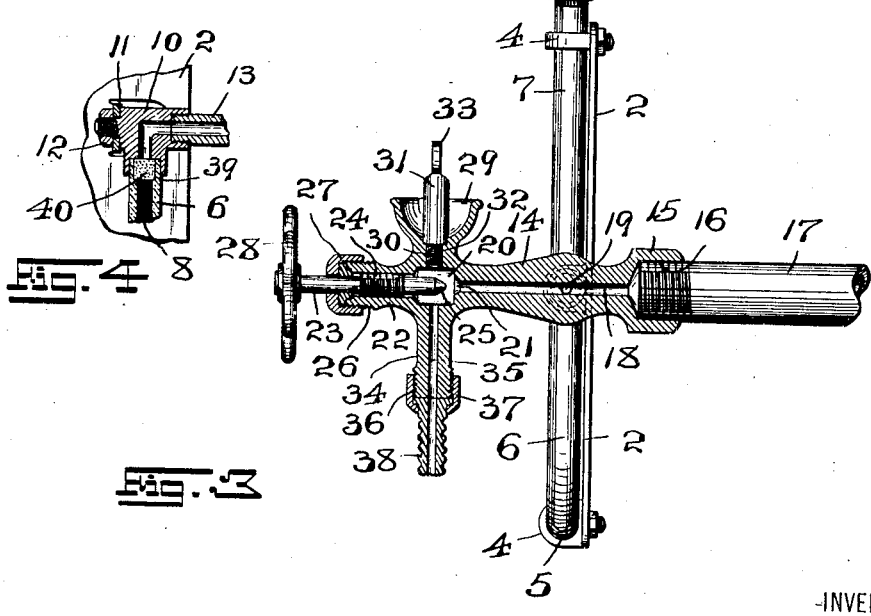
INVENTOR:
Philip Meyer,
BY
Braintzel and Richards,
ATTORNEYS.

UNITED STATES PATENT OFFICE.

PHILIP MEYER, OF NEWARK, NEW JERSEY.

PIPE-TESTING AND LEAK-FINDING DEVICE.

1,340,176.  Specification of Letters Patent.  Patented May 18, 1920.

Application filed August 10, 1918. Serial No. 249,262.

*To all whom it may concern:*

Be it known that I, PHILIP MEYER, a citizen of the United States, residing at Newark, in the county of Essex and State of New Jersey, have invented certain new and useful Improvements in Pipe-Testing and Leak-Finding Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to testing devices; and, the present invention has reference, more particularly, to a novel device for use in connection with systems of piping in buildings, etc., for finding leaks and especially for demonstrating whether the joints in connected pipe-sections have been properly made, and that there are no leaks at such points.

The present invention, therefore, has for its principal object to provide a mercury-column testing device for the general character hereinafter more fully set forth, which is easily attached to an open end of a system of piping, such as gas or water-conveying pipes made up of jointed sections, the device pipes made up of jointed sections, the device as well as the piping, being adapted to be brought under pressure, and the device serving as a detector or indicator of a leak in the system of piping.

The invention has for its two principal purposes, firstly:—to provide a recording indicator, which after a predetermined time will indicate by the height of a mercury column, whether the pressure within the system of piping has been reduced, thereby indicating a leak; and, secondly:—the device acting as a leak-finder by the escape at such leak of a scented gaseous fluid, as ether, or the like, which is forced from the device with the piping, and positively by the escaping odor indicates the location of the leak.

Other objects of the present invention not at this time more particularly enumerated will be clearly understood from the following detailed description of the present invention.

With the various objects of the present invention in view, the said invention consists, primarily, in the novel leak-testing device or indicator hereinafter set forth; and, the invention consists, furthermore, in the novel arrangements and constructions of the several parts of the same, all of which will be more fully described in the following specification, and then finally embodied in the clauses of the claim which are appended to and which form an essential part of the said specification.

This invention is clearly illustrated in the accompanying drawings, in which:—

Figure 1 is a front elevation of a pipe-testing and leak-indicating device, showing one embodiment of the principles of the present invention; Fig. 2 is a side elevation of the same, looking in the direction of the arrow *x* in said Fig. 1; and Fig. 3 is a vertical section of the device, said section being taken on line 3—3 in said Fig. 1, looking in the direction of the arrow *y*.

Fig. 4 is a detail sectional representation of a pipe-connection between the mercury-containing column and a pressure-conveying duct of the device.

Similar characters of reference are employed in the said above described views, to indicate corresponding parts.

Referring now to the several figures of the drawings, the reference-character 1 indicates a complete pipe-testing and leak-indicating device made according to and embodying the principles of the present invention, the same comprising a main body 2 usually in the form of a plate of suitable length and any desired marginal configuration, the said plate being provided upon its face with a column of a suitably disposed pressure-indicating scale or graduations, as 3. Contiguous to the said scale or graduations, and suitably secured upon the face of said body or plate 2, by means of fastening devices 4, or in any other suitable manner, is a U-shaped tubular column 5, comprising a pair of legs 6 and 7, one of which legs, as 7, is preferably made longer than the other leg 6. This column, in which is disposed a quantity of mercury, as 8, or other indicating fluid, is made of a transparent material, as glass, transparent celluloid, or the like, and the upper end-portion of said column 7 is closed, usually by means of a suitably formed cap, as 9. Suitably mounted upon the upper end of the said leg 6 is a T-shaped or other suitably formed pipe-fitting, as 10, the said fitting be secured to a fastening member 11 upon said body or plate 2, by means of a bolt or screw, as 12, the screw-threaded shank of which also closes the one open portion of the fitting, as will be clearly understood from an inspection of Fig. 1 of the drawings.

Connected with said fitting 10, and extending laterally therefrom, is a tubular element or member, as 13, with which is connected, and is in communication therewith, another tubular element or member 14. Upon its one end, this element or member 14 is made with a nut-shaped attaching socket 15, which is internally screw-threaded, as at 16, and as shown in Fig. 3 of the drawings, for attachment to an open end-portion of a system of piping which is to be tested, and fragmentary portions of which are shown in Figs. 2 and 3 of the drawings, and are indicated by the reference-characters 17. As shown in said Fig. 3. the main body-portion of the said element or member 14 is formed with a duct 18 with which the duct 19 of the previously-mentioned element or member 13 is in communication, the said duct 19 connecting with a chamber 20 and being formed with a cone-shaped seat 21. An extension 22 of said element or member 14 is internally screw-threaded for the reception of the screw-threaded shank-portion 24 of a valve-stem 23. the jointed or cone-shaped end-portion 25 of which is adapted to be seated upon the seat 21, so as to close the communication between said duct 19 and the chamber 20, when necessary.

The said extension 22 is also externally screw-threaded, as at 26, for the reception thereon of a packing nut 27, or the like, the said valve-stem extending through the said nut and being provided upon its free end-portion with a hand-wheel 28, or other suitable means for operating the valve-stem and to open or close the passageway between the chamber 20 and the duct 19, as may be necessary. At a point above the said chamber 20, and suitably connected with the member or element 14, or forming a part thereof, is a cup or funnel-shaped receiving member 29, formed with a screw-threaded outlet, as 30, which communicates with the chamber 20. This screw threaded outlet can be closed by the screw-threaded shank-portion 32 of a stem 31 which is provided with a suitable fingerpiece, as 33, upon its upper end for the manipulation of said Fig. 3 of the drawings. Connected with the said member or element 14 is a tubular member 34, formed with a duct 35 leading to the chamber 20, and suitably attached to the externally screw-threaded end-portion 36 of the member 34, by means of a fitting, as 37, is a tubular nozzle, as 38, for attachment thereto of the usual flexible tubing of a suitable force-pump.

Having in the foregoing description fully set forth the general construction of my novel pipe-testing and leak-indicating device, I will briefly describe its application and operation in testing out a system of piping for pressure, as well as for leak or leaks.

As soon as a line of piping, comprising a series of connected pipe-sections, has been completed, all the open portions of the line of pipes are securely closed, except one opening upon and over which the testing is mounted, in the manner indicated in said Figs. 2 and 3 of the drawings. A force-pump is thereupon attached to the nozzle 38, and the valve-stem 23 brought into the open relation shown in said Fig. 3. The stem 31 is also raised, so as to open the outlet 30 of the funnel-shaped member 29, and a quantity of ether or other strongly scented medium is poured into said member 29 and permitted to pass into the chamber, after which the stem is again closed down. By means of the force-pump, air is now forced through the nozzle 38 and member 34 into the chamber, where it becomes permeated with the ether or the like, and is forced through the duct 18 into the system of piping, the air being continued to be forced into the piping against the column of mercury, until the desired pressure is indicated by the raised column of mercury in the leg 7 upon the scale 3. Immediately the valve-stem 23 is operated, so as to close its end 25 down upon the cone-shaped seat 21. The closed attachment is now left upon the system of piping for a time, say over night, and if the mecury column indicates the same degree of pressure upon the scale, then this is sufficient indication that the system of piping has been properly installed. A fall of the mercury column will, however, indicate a leak, and this leak can readily be discovered by smelling along the piping, until at the leaky point the odor of the escaping ether or the like is detected.

To prevent leakage of the mercury from the U-shaped tubular column 5, the leg 6 is provided in its upper end-portion where it is attached to the fitting or pipe-connection 10 with a socketed part, as 39, in which is disposed a packing member 40 of a suitable porous material, which will allow the air under pressure to pass through the same, so as to properly act against the end of the mercury column 8, but when carrying the device in the tool-bag, or when lying upon its side from passing into the tubular member or element 13, as will be clearly evident from an inspection of Fig. 4 of the drawings.

For the same purpose, the upper end-portion of the leg 7 may also be socketed, as at 41, for the reception of a packing 42, held in place by the cap 9, so as to prevent any possible escape of the mercury at this point.

Of course, I am aware that some changes may be made in the general arrangements and combinations of the several devices and parts without departing from the said invention as set forth in the foregoing specification and as defined in the clauses of the claim which are appended thereto. Hence I do not limit my present invention to the exact arrangements and combinations of the various devices and parts as described in the said specification, nor do I confine myself to the exact details of the construction of the said parts as illustrated in the accompanying drawings.

I claim:—

1. In a pipe-testing and leak-indicating device, a main plate, a pressure-indicating means mounted upon said plate, a T-shaped fitting connected with said indicating means, a fastening member upon said plate, a bolt for securing said fitting to said fastening member, combined with a gas-conveying means comprising a tubular body-member provided with means for its attachment to a line of piping, an inlet-member connected with said body-member for attachment thereto of means for forcing air under pressure into said body-member, said body-member being provided with a valve-seat, and a valve-stem connected with said body-member for closing said valve-seat, said body-member being provided with a receiving chamber located in front of said valve-seat and in communication with the tubular portion of said body-member back of said valve-seat.

2. In a pipe-testing and leak-indicating device, a main plate, a pressure-indicating means mounted upon said plate, a T-shaped fitting connected with said indicating means, a fastening member upon said plate, a bolt for securing said fitting to said fastening member, combined with a gas-conveying means comprising a tubular body-member provided with means for its attachment to a line of piping, an inlet-member connected with said body-member for attachment thereto of means for forcing air under pressure into said body-member, said body-member being provided with a valve-seat, a valve-stem connected with said body-member for closing said valve-seat, said body-member being provided with a receiving chamber located in front of said valve-seat and in communication with the tubular portion of said body-member back of said valve-seat, a funnel-shaped receiving element also connected with said body-member and in communication with the receiving chamber thereof, and means for closing the means of communication between said receiving element and the receiving chamber of said body-member.

3. In a pipe-testing and leak-indicating device, a main plate, a pressure-indicating means mounted upon said plate, consisting of a U-shaped tubular member provided with a column of mercury, means for closing one end of said tubular member, a T-shaped fitting mounted upon the other end of said tubular member, a fastening member upon said plate, a bolt for securing said fitting to said fastening member, combined with a gas-conveying means comprising a tubular body-member provided with means for its attachment to a line of piping, an inlet-member connected with said body-member for attachment thereto of means for forcing air under pressure into said body-member, said body-member being provided with a valve-seat, and a valve-stem connected with said body-member for closing said valve-seat, said body member being provided with a receiving chamber located in front of said valve-seat and in communication with the tubular portion of said body-member back of said valve-seat.

4. In a pipe-testing and leak-indicating device, a main plate, a pressure-indicating means mounted upon said plate, consisting of a U-shaped tubular member provided with a column of mercury, means for closing one end of said tubular member, a T-shaped fitting mounted upon the other end of said tubular member, a fastening member upon said plate, a bolt for securing said fitting to said fastening member, combined with a gas-conveying means comprising a tubular body-member provided with means for its attachment to a line of piping, an inlet-member connected with said body member for attachment thereto of means for forcing air under pressure into said body-member, said body-member being provided with a valve-seat, a valve-stem connected with said body-member for closing said valve-seat, said body-member being provided with a receiving chamber located in front of said valve-seat and in communication with the tubular portion of said body-member back of said valve-seat, a funnel-shaped receiving element also connected with said body-member and in communication with the receiving chamber thereof, and means for closing the means of communication between said receiving element and the receiving chamber of said body-member.

5. A pipe-testing and leak-finding device comprising a tubular body-member provided with means for its attachment to a line of piping, an inlet-member connected with said body-member for attachment thereto of means for forcing air under pressure into said body-member, means for closing the tubular portion of said body-member, and another tubular member connected with and extending from said body-member and provided with a pressure-indicating medium, and a packing-member located within and extending entirely across the tubular interior of said tubular member so as to substantially close its interior, said packing-member, however, being not impervious to the air-pressure but impervious to the pressure-indicating medium located between the tubular body-member and the tubular member which is provided with the pressure-indicating medium.

6. A pipe-testing and leak-finding device comprising a tubular body-member provided with means for its attachment to a line of piping, an inlet-member connected with said body-member for attachment thereto of means for forcing air under pressure into said body-member, means for closing the tubular portion of said body-member, and another tubular member connected with and extending from said body-member and provided with a pressure-indicating medium, combined with a main body having a pressure-indicating scale thereon, and a packing-member located within and extending entirely across the tubular interior of said tubular member so as to substantially close its interior, said packing-member, however, being not impervious to the air-pressure but impervious to the pressure-indicating medium located between the tubular body-member and the tubular member which is provided with the pressure-indicating medium.

7. A pipe-testing and leak-finding device comprising a tubular body-member provided with means for its attachment to a line of piping, an inlet-member connected with said body-member for attachment thereto of means for forcing air under pressure into said body-member, means for closing the tubular portion of said body-member, a funnel-shaped receiving element also connected with and in communication with the tubular portion of said body-member, means for closing the means of communication between said receiving element and the body-member, and another tubular member connected with and extending from said body-member and provided with a pressure-indicating medium, and a packing-member located within and extending entirely across the tubular interior of said tubular member so as to substantially close its interior, said packing-member, however, being not impervious to the air-pressure but impervious to the pressure-indicating medium located between the tubular body-member and the tubular member which is provided with the pressure-indicating medium.

8. A pipe-testing and leak-finding device comprising a tubular body-member provided with means for its attachment to a line of piping, an inlet-member connected with said body-member for attachment thereto of means for forcing air under pressure into said body-member, means for closing the tubular portion of said body-member, a funnel-shaped receiving element also connected with and in communication with the tubular portion of said body-member, means for closing the means of communication between said receiving element and the body-member, and another tubular member connected with and extending from said body-member and provided with a pressure-indicating medium, combined with a main body having a pressure-indicating scale thereon, and a packing member located within and extending entirely across the tubular interior of said tubular member so as to substantially close its interior, said packing-member, however, being not impervious to the air-pressure but impervious to the pressure indicating medium located between the tubular body-member and the tubular member which is provided with the pressure-indicating medium.

9. A pipe-testing and leak-finding device comprising a tubular body-member provided with means for its attachment to a line of piping, an inlet-member connected with said body-member for attachment thereto of means for forcing air under pressure into said body-member, means for closing the tubular portion of said body-member, a tubular member extending laterally from said body-member, a pipe-fitting attachment to said laterally extending member, a U-shaped tubular column attached to said fitting and provided with a pressure-indicating medium, a packing-member located within and extending entirely across the tubular interior of said tubular member so as to substantially close its interior, said packing-member, however, being not impervious to the air pressure but impervious to the pressure-indicating medium located between said fitting and the attached end of the U-shaped column, a cap upon the other end-portion of said U-shaped column, a packing between said cap and the last-mentioned end-portion of said U-shaped column.

10. A pipe-testing and leak-finding device comprising a tubular body-member provided with means for its attachment to a line of piping, an inlet member connected with said body-member for attachment thereto of means for forcing air under pressure into said body-member, means for closing the tubular portion of said body-member, a tubular member extending laterally from said body-member, a pipe-fitting attachment to said laterally extending member, a U-shaped tubular column attached to said fitting and provided with a pressure-indicating medium, a packing-member located within and extending entirely across the tubular interior of said tubular member so as to substantially close its interior, said packing-member, however, being not impervious to the air-pressure but impervious to the pressure-indicating medium located between said fitting and the attached end of the U-shaped column, a cap upon the other end-portion of said U-shaped column, a packing between said cap and the last-mentioned end-portion of said U-shaped column, combined with a main body having a pressure-indicating scale thereon.

In testimony that I claim the invention set forth above I have hereunto set my hand this 5th day of August, 1918.

PHILIP MEYER.

Witnesses:
 FRED'K C. FRAENTZEL,
 FRED'K H. W. FRAENTZEL.